Figure 1:
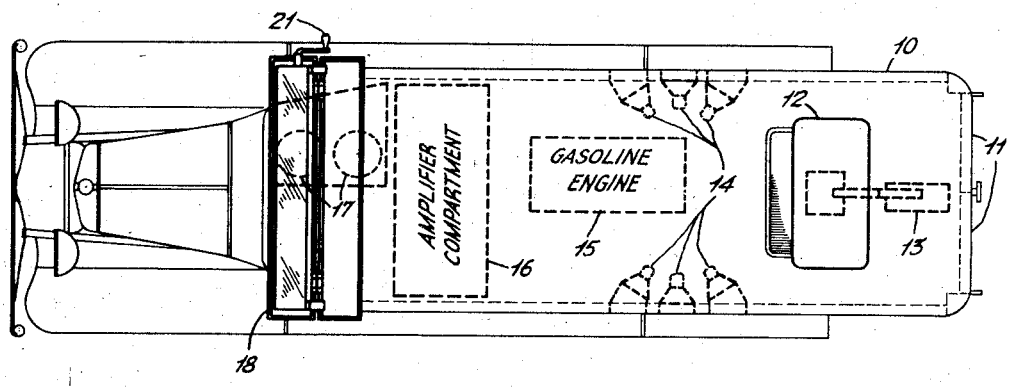

Dec. 29, 1936.  E. B. PATTERSON  2,066,158

PROJECTION OF MOVING PICTURES

Filed Feb. 17, 1933

INVENTOR
EDWARD B. PATTERSON
BY
ATTORNEY

Patented Dec. 29, 1936

2,066,158

UNITED STATES PATENT OFFICE 2,066,158

PROJECTION OF MOVING PICTURES

Edward B. Patterson, Merchantville, N. J., assignor to Radio Corporation of America, a corporation of Delaware Application February 17, 1933, Serial No. 657,158

4 Claims. (Cl. 88—16.2)

This invention relates to the projection of moving pictures, either with or without sound synchronized with the action of the projected pictures, and has for its principal object the provision of an improved picture reproducing apparatus which is readily portable in compact form from one location to another and has its various parts so disposed that they may be quickly brought into operative relation with respect to one another.

A further object of the invention is the provision of an improved sound picture vehicle which is so constructed that the projected pictures may be easily observed and the reproduced sound may be clearly heard at different points to the front and rear of the vehicle.

Other objects of the invention are the provision of an improved arrangement whereby the various parts are securely protected from dust and the like when they are not in operation, an improved mounting of a translucent motion projection screen, an improved picture projecting system which occupies a minimum of space, and an improved arrangement of the power source with respect to the various elements of the apparatus by which the power is utilized.

Various types of motion picture vehicles have been provided in the past. Many of these vehicles have not been altogether satisfactory, however, for the reason that the different parts of the projecting apparatus are not constructed as an integral part of the vehicle, are not sufficiently protected from dust, moisture and the like, and are not readily operated without rapid deterioration of the projecting screen and other parts. In accordance with this invention, these difficulties are avoided by the provision of a collapsible projecting screen mounting which permits the screen to be assembled to operative condition from a dust and moisture proof casing without contact of the operator's hands with the screen, a projecting system which includes a reflecting surface mounted on the cover of a relative small opening in the vehicle roof, and a sound reproducer mounting which permits a cover to be readily moved over the mouths of the loud speakers when they are not in use.

The invention will be better understood from the following description when considered in connection with the accompanying drawing and its scope will be pointed out in the appended claims.

Figure 2:
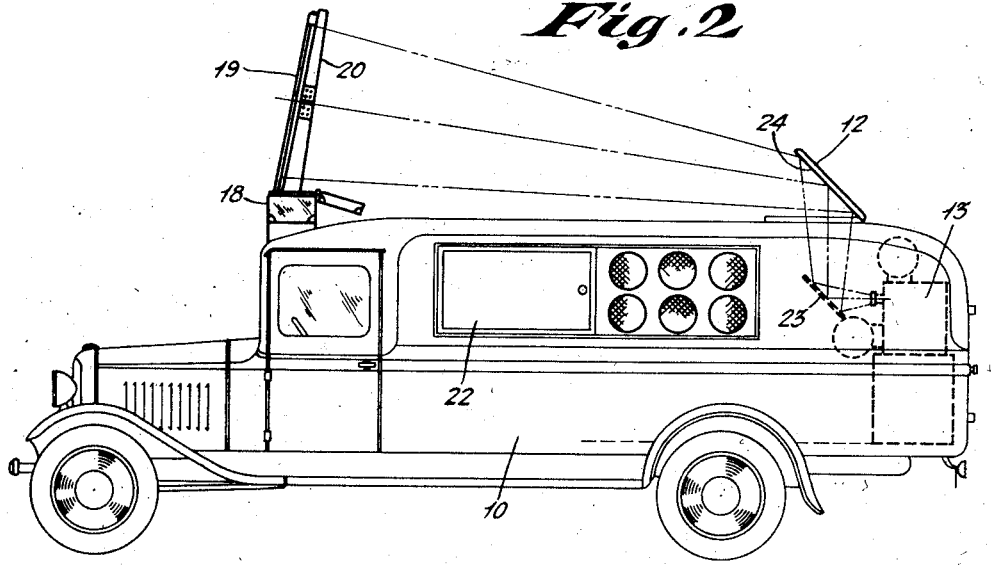

Referring to the drawing,

Fig. 1 is a plan view illustrating the application of the invention to a motor vehicle, and Fig. 2 is a side view of the apparatus illustrated by Fig. 1.

This apparatus includes a motor vehicle 10 provided with rear doors 11 and with a hinged cover or door 12 on its top. Disposed within the vehicle are a motion picture projector 13, a plurality of loud speakers 14, a gasoline engine 15 for driving the generating equipment from which operating current is derived, a compartment 16 containing the audio current amplifiers, and a dual turntable 17 which may be utilized to reproduce the audio current transmitted through the amplifier 16 for operation of the loud speakers 14 in a manner well understood by those skilled in the art. It is apparent that this reproduced current may be derived from a sound track on the motion picture film instead of from the dual turntable phonograph 17.

Mounted at the front of the vehicle top is a case or trunk 18 wherein a collapsible translucent motion picture screen 19 is mounted. This screen is provided at each side with collapsible supports 20 which are unfolded by means of a hand crank 21 to unroll the screen 19 and stretch it taut in the position shown by Fig. 2, and are folded by rotation of the crank 21 to roll up the screen and dispose it and the supports in the case 18. Since the entire operation of unrolling and stretching the film is effected by rotation of the crank 21, all contact with the projection surface is avoided. When the screen is disposed within the case 18 it is securely protected from dust and moisture. Long life of the screen under the rather adverse conditions of its operation is thus ensured.

The loud speakers 14 are mounted on opposite sides of the vehicle. In order to protect them from unnecessary exposure, sliding panels 22 are provided, these panels being so arranged as to securely cover the mouths of the loud speakers when they are not operating.

The picture projecting system includes oppositely disposed reflecting surfaces or mirrors 23 and 24. The mirror 24 is mounted on the underside of the hinged cover 12 which is readily moved downwardly to cover the relatively small opening in the vehicle top.

This arrangement has the important advantage that all the parts are permanently mounted and are easily and quickly brought into cooperative relation with one another. Due to the translucency of the screen 19, the projected picture is visible from both the front and the rear of the vehicle thus greatly increasing the range from which it may be observed.

Having thus described my invention, what I claim is:

1. The combination of a vehicle including a roof provided with a relatively small opening substantially smaller than that required for direct projection, a cover for said opening, a screen mounted on the roof, a motion picture projector within the vehicle, a mirror for receiving light from the projector through the opening and for reflecting the received light to the screen and means mounted within the vehicle for reproducing sound synchronously with the projection of the picture.

2. The combination of a vehicle including a roof provided with a relatively small opening substantially smaller than that required for direct projection, a cover for said opening, a screen mounted on the roof, a motion picture projector within the vehicle, a mirror for receiving light from the projector through the opening and for reflecting the received light to the screen and means mounted within the vehicle for reproducing sound synchronously with the projection of the picture, the said sound reproducing means including a loud speaker mounted on the inner face of a wall of said vehicle.

3. The combination of a vehicle including a roof provided with a relatively small opening substantially smaller than that required for direct projection, a cover for said opening, a screen mounted on the roof, a motion picture projector within the vehicle, a mirror for receiving light from the projector through the opening and for reflecting the received light to the screen and means mounted within the vehicle for reproducing sound synchronously with the projection of the picture, the said sound reproducing means including a loud speaker mounted on the inner face of a wall of said vehicle and a sliding panel arranged on the outer face of the wall of said vehicle to cover the opening of said loud speaker when it is not operating.

4. The combination of a vehicle including a roof provided with a relatively small opening substantially smaller than that required for direct projection, a cover for said opening, a collapsible screen mounted in a case mounted on the roof, a motion picture projector within the vehicle, a mirror for receiving light from the projector through the opening and for reflecting the received light to the screen and means mounted within the vehicle for reproducing sound synchronously with the projection of the picture.

EDWARD B. PATTERSON.